United States Patent [19]
Darzinskis

[11] Patent Number: 4,489,938
[45] Date of Patent: Dec. 25, 1984

[54] VIDEO COMPUTER SYSTEM CONTROLLED BY OPERATION OF ELASTOMERIC EXERCISE APPARATUS

[76] Inventor: Kazimir R. Darzinskis, 3533 East Ave., Berwyn, Ill. 60402

[21] Appl. No.: 506,016

[22] Filed: Jun. 20, 1983

[51] Int. Cl.³ .............................................. A63B 21/02
[52] U.S. Cl. ........................... 272/142; 273/DIG. 28; 272/DIG. 5; 272/67
[58] Field of Search ...................... 272/142, 67, 68, 70, 272/70.2, DIG. 5; 128/25 R; 273/DIG. 28

[56] References Cited

U.S. PATENT DOCUMENTS 4,195,835  4/1980  Hinds et al. .......................... 272/142
4,278,095  7/1981  Lapeyre ...................... 273/DIG. 28

FOREIGN PATENT DOCUMENTS 2822343  11/1979  Fed. Rep. of Germany ... 273/DIG. 28

Primary Examiner—William H. Grieb
Assistant Examiner—Leo P. Picard
Attorney, Agent, or Firm—Chas. W. Rummler

[57] ABSTRACT

The combination of an elastomeric physical exercise device and a video computer apparatus arranged for manual operation or play of the game by the person using the exercise function of the combination for simultaneous physical exercise and wherein the "fire" operation of a game play is actuated solely through operation of the elastomeric portion of the apparatus.

10 Claims, 7 Drawing Figures

U.S. Patent  Dec. 25, 1984  Sheet 1 of 2  4,489,938
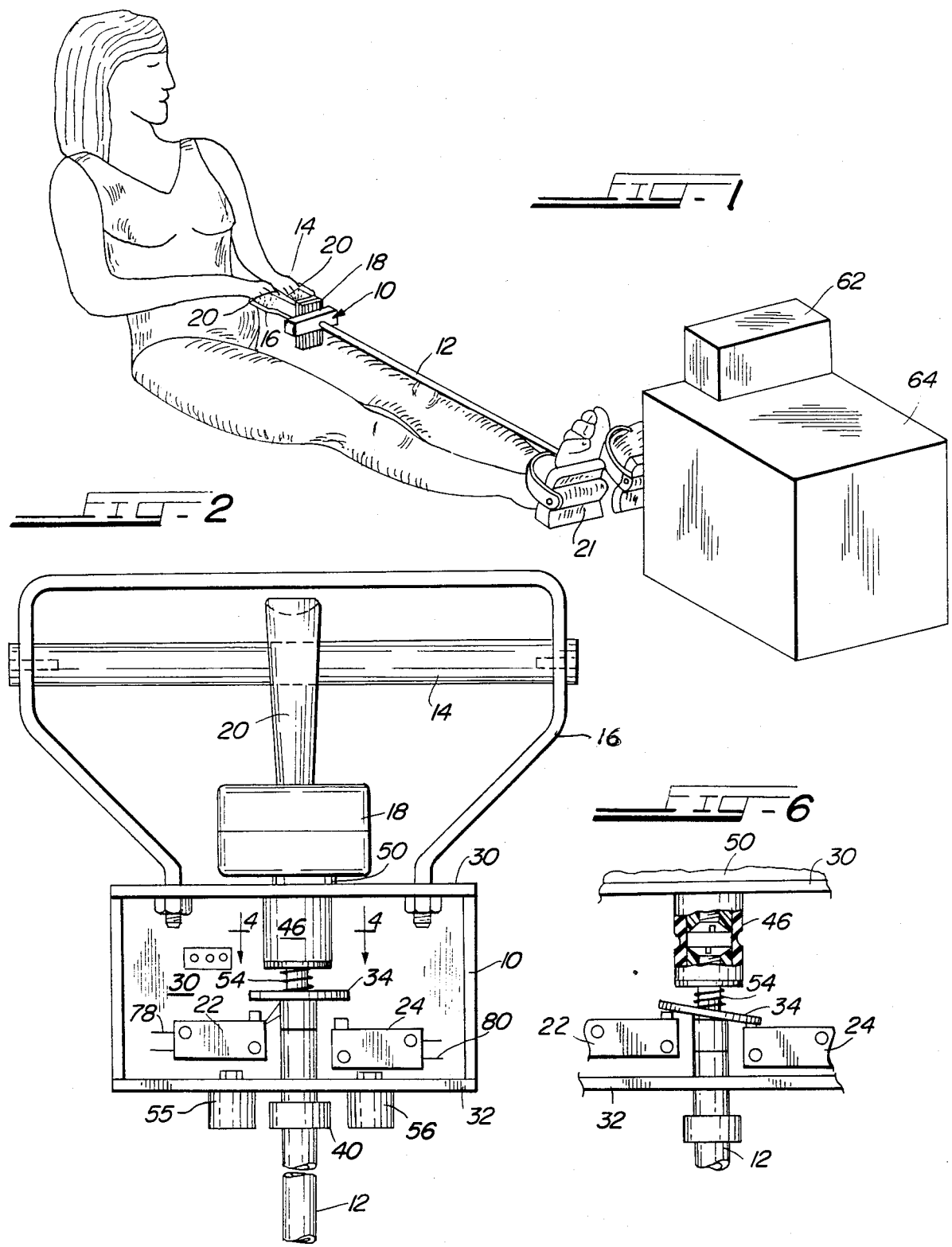

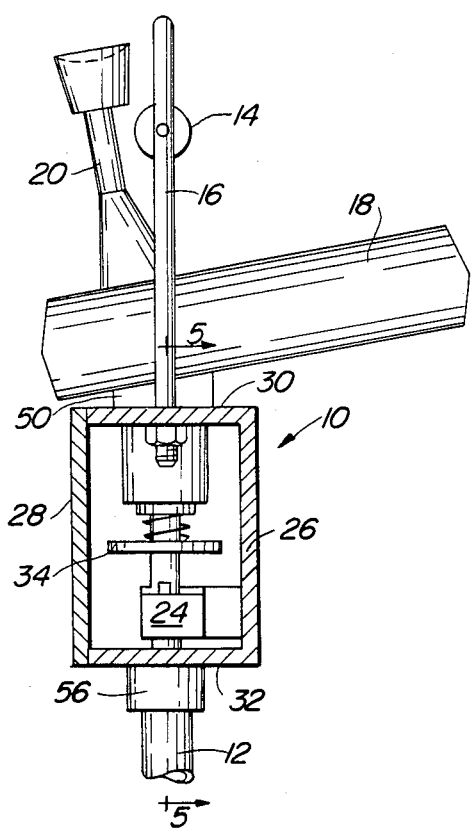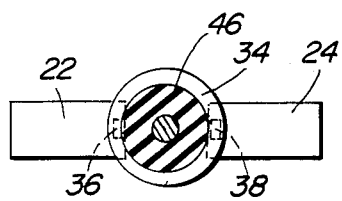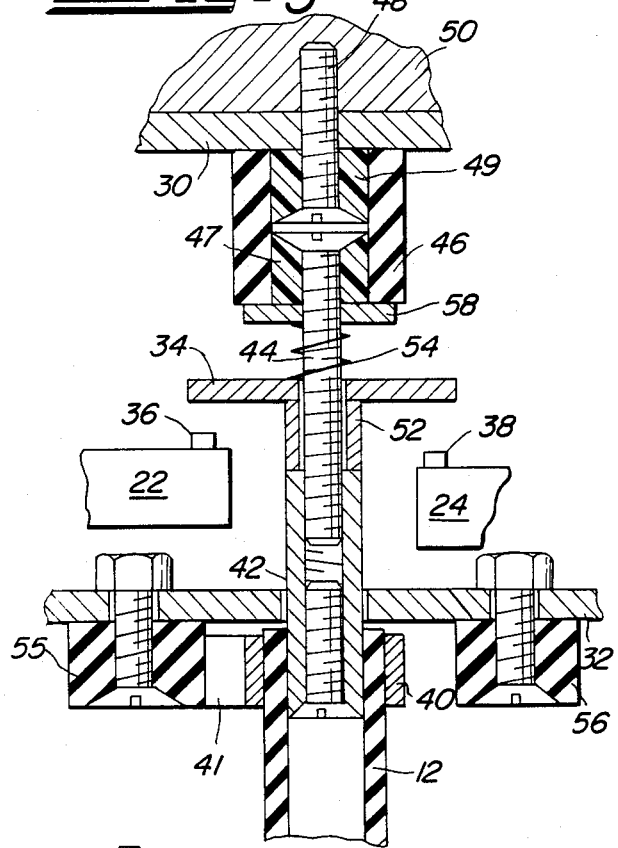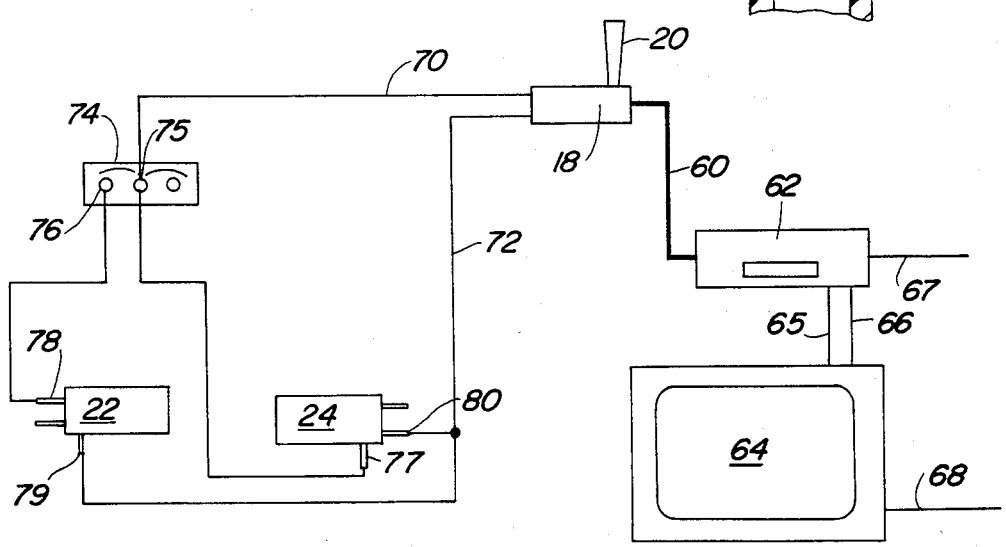

VIDEO COMPUTER SYSTEM CONTROLLED BY OPERATION OF ELASTOMERIC EXERCISE APPARATUS

BACKGROUND OF THE INVENTION

Heretofore, the use of physical exercise apparatus, while of material benefit to the user, has been a rather boring occupation for lack of something to attract the user's interest away from the mundane matter of maintaining good physical condition and some attention has been directed to providing some kind of pleasing entertainment while the exercising is in progress. With respect to the elastomeric type of exercise apparatus, however, it appears that little or no effort has been given to the matter of making use of the apparatus more interesting and pleasant, and the present invention is intended to provide a cure for this problem.

SUMMARY OF THE INVENTION

The gist of this invention is the combination with a conventional exercising apparatus having, in part, a stretching member comprising an elastomer, or its mechanical equivalent, connected with a handlebar for manual stretching operation of the apparatus, and a video computer input means mounted close to the handlebar in such a way as to be operable by the exerciser's fingers or thumbs while the exercising process is going on. The video computer input means comprises a conventional joy stick device for play operation of the game, but in which the usual joy stick operated "fire" switch means is disconnected and the "fire" circuit is connected through an independent transducer switch means operated solely by the stretching operation of the elastomer.

The assembly of the switch means for operating the "fire" action required by the computer game and the mechanism operating the switch means comprises a transducer for converting the "fire" function of the conventional joy stick assembly to an independent unit on which the handlebar portion of the exercise apparatus is directly mounted, the usual joy stick and its switch containing body being suitably mounted onto the frame of the transducer assembly in such a manner that the joy stick is positioned to be readily operable by a thumb or finger of the user's hands which can grip the handlebar for working of the exercise apparatus.

In the form shown, the stretching elastomer, or a mechanical equivalent thereof such as a spring, is connected directly to the transducer assembly whereby pulling action on the stretching means causes operation of the transducer switch mechanism for the "fire" function involved in the play of the computer game.

In this manner, the person using the exercise apparatus can, simultaneously with the exercising operation, enjoy the play of a video game system, or, for that matter, any kind of joy stick operated computer controlled device, thereby enjoying a convenient source of entertainment which has the particular advantage of encouraging good exercise on the part of the user.

The transducer assembly is arranged for adjustment of the connection with the stretching means, whereby the amount of pull for operating the transducer switch mechanism to perform the "fire" operation of the play of the game can be regulated and also function to protect the transducer against damage that may result from an extra strong pull on the stretching means.

DESCRIPTION OF THE DRAWINGS

A specific embodiment of my invention is illustrated in the accompanying drawings, of which:

FIG. 1 is a perspective view showing the invention as it may be used with one tension type of exercise apparatus;

FIG. 2 is an elevational view of the invention with its cover removed to illustrate its principal component parts;

FIG. 3 is a partially sectioned side view of the same;

FIG. 4 is a sectional view as taken on line 4—4 of FIG. 2;

FIG. 5 is a fragmentary sectional view as taken on line 5—5 of FIG. 3;

FIG. 6 is a fragmentary sectional view showing operation of the parts for actuation of the microswitches 22 and 24; and FIG. 7 is a diagrammatic view illustrating the electdical circuit for a video computer system embodying control means according to my invention.

A TYPICAL EMBODIMENT OF THE INVENTION

In the form shown in the drawings and with particular reference to FIGS. 2 and 3, the video game operating means comprises a transducer 10 arranged for connection with a stretching member 12 of a physical exercising apparatus such as that illustrated in FIG. 1 and having mounted thereon a suitable handlebar or handgrip means 14 supported by bracket means 16 directly connected to the transducer body 10 whereby an exercise device, such as that shown in FIG. 1, can be operated by the user. The switch housing body 18 of a joy stick operated data input means for a computer display system is fixedly mounted on the frame of the transducer 10 below the handlebar 14 in such a manner that the joy stick element 20 is disposed for ready engagement by fingers or thumbs of the user's hands while the user is grasping the handlebar 14 for operation of the exercise apparatus by pulling on and stretching the elastomeric member 12 which, as illustrated in FIG. 1, has its opposite end connected to a relatively fixed member such as the stirrup arrangement 21 for engagement by the user's feet.

The video display data input means 18 is of conventional construction and arrangement with the exception that the "fire" component is disconnected from joy stick operation and the normal electrical connections therefor are led directly to microswitches 22 and 24 comprising the transducer 10 for performing the "fire" operation which otherwise would be accomplished by operation of the joy stick 20 and the conventional switch mechanism contained in the body 18 of the video computer data input means.

As shown in FIGS. 2, 3 and 5, the transducer 10 is in the form of a box having front and back walls 26 and 28, respectively, extending between top and bottom walls 30 and 32 and conventional end walls, the back wall 28 being suitably secured so as to be removable for access to the switch and switch operating components. The microswitches 22 and 24 are mounted on the front wall 26 and are disposed so that switch 22 is at a somewhat higher level than the switch 24 whereby they can be successively operated by tensioning pull on the elastomer 12 which connects with means carrying a pressure disc or plate 34 adapted to engage the microswitch operating buttons 36 and 38 successively, as will be shown.

Referring to FIG. 5, it will be seen that the elastomer or stretch tensioning member 12 is fastened by a spring clamp 40 onto the end of an internally threaded sleeve 42 which projects slidably from the bottom 32 of the transducer box 10. The sleeve 42 is threaded onto the lower end of a screw 44 which extends upwardly into a very stiff but elastic final resistance member 46 to which it is suitably attached, as by tapped spacer means 47 which is cemented to the inside wall of member 46. The resistance member 46 is in turn similarly fixed to a screw 48 which threads into the upper transducer wall 30 and thence into a metal strap 50 for secure attachment to the transducer box 10, the screw 48 being attached to the member 46 by a tapped spacer means 49 which is also cemented to member 46.

A typical exercise apparatus such as that shown in FIG. 1 will employ an elastomeric or spring stretch member 12 having a relaxed length of about 12 inches and an expected stretched maximum length of about 30 inches and if the member 12 is to be of latex rubber, it may be of tubular form with an external diameter of $\frac{3}{8}$ inch and a wall thickness of 1/16 inch. About $\frac{1}{2}$ inch of length of the stretch member 12 is at each end fixedly connected to nonelastic members by means of cement means on the inner walls of said stretch member. This leaves a free stretchable length of ($12''-\frac{1}{2}''-\frac{1}{2}''$) about 11 inches.

On the other hand, the resistance member 46 must be of much less elastic construction, stretchable under full load just about sufficient to move the pressure disc 34 into engagement with the button 38 of microswitch 24. For example, in the transducer 10, for the apparatus shown in FIG. 1, I would make the resistance member 46 a short tube of about 9/16 inch long and $\frac{3}{4}$ inch in outside diameter. The spacers 47 and 49 holding the screws 44 and 48 would be of nylon plastic and preferably about 5/16 inch in diameter and $\frac{1}{4}$ inch long (each), leaving an uncemented space, or free stretchable area, between the screw heads of about 1/16 inch. This form of the resistance member 46 would stretch about $\frac{1}{8}$ to 3/16 inch when the stretching member 12 is at its maximum expected stretched length.

The microswitches may be any miniature snap action, momentary contact switch with low force operating buttons.

It will now be seen that tensioning the stretch member 12 will exert a downward (or outward) pull on the sleeve 42 which in turn exerts a pull on the screw 44 which is directly transmitted to the resistance member 46 which functions to limit the amount of movement of the transducer components to a relatively small amount sufficient only for operation of the microswitches 22 and 24. To do this, the resistance member 46 must be heavy enough in stretch resistance to have only a fraction of the stretching extent of the elastomer element 12, in the course of its intended use, sufficient to operate the switches 22 and 24.

As shown in FIGS. 2 and 5, the microswitches 22 and 24 are mounted to the front wall 26 of the transducer 10 near the bottom thereof and are disposed so that their operating buttons 36 and 38 are close to the sleeve 42 so as to be within the diameter or area of the pressure disc or plate 34 which is carried loosely on a spacer element 52 slidably mounted on the upper end of the sleeve 42. A coiled spring 54 bears between the pressure plate 34 and a washer 58, mounted on the screw 44 below the resistance member 46, and thus affords sufficient force on the pressure plate 34 so that it can operate the switches 22 and 24 upon engagement with the switch buttons 36 and 38 successively. The force required is quite light and to do this, the pressure plate must be loose enough on the screw 44 to be able to tilt, when operatively resting on the switch button 32, a sufficient amount to operatively engage the switch button 38, as illustrated by FIG. 6. A particular function of the washer 58 is to prevent any cement from within the member 46 leaking onto the very light spring 54.

The spacing of the microswitches 22 and 24 axially of the transducer mechanism, relative to the stretch strength of the resistance member 46, is such that, when the exercise apparatus is in use the first stretching of the elastomer 12 against the resistance of the member 46 will cause the pressure plate 34 to move downward to operate the microswitch 22 by engagement with the button 36; the switch 24 being at a lower level so that it will not be operated by the pressure plate 34 until the elastomer 12 has been stretched to its maximum against the resistance of the member 46 whereupon the stretching of the member 46 will allow the pressure plate to tilt enough to engage the switch button 38. This action is illustrated by FIG. 6.

Adjustment of the distance that the pressure plate 34 can move in response to the amount of stretch imparted to the resistance member 46, as might be caused by relatively light or very strong pull on the stretch member 12, can be had by simply turning the sleeve 42 relative to the screw 44 to adjust the level of the pressure plate relative to the microswitch buttons 36–38. The stretching of the resistance member 46 is, of course, very limited and hence adjustment of the level of the pressure plate is relatively small. Such adjustment may be occasioned by the need for tuning the "fire" function of the game play according to the desire of the user of the apparatus.

In the form shown, the turning of the screw 42 for adjustment of the pressure plate level is limited by engagement of the wings 41 of the spring clamp 40 with rubber bumpers 55 and 56 secured to the bottom 32 of the transducer housing on opposite sides of the spring clamp, as shown in FIG. 5. Thus, to make more than a fraction of a turn, one or both of the bumpers 55–56 must first be removed and then replaced, when adjustment is completed, in order to serve their primary purpose of limiting inadvertent turning of the screw 42 by the normal twisting action of the stretching means 12 during exercising use of the apparatus.

As shown in FIG. 5, the tapped spacer means 47 and 49 are screwed tightly against the head of the respective screws 44 and 48 and when installed in the resistance member 46 are cemented to the internal wall surface thereof, leaving only a relatively small portion of the member 46, between the heads of the screws, for stretching as a pulling force is applied to the sleeve 42 by the elastomer 12.

The video computer operating circuit is shown in FIG. 7 wherein the joy stick switch housing 18 is connected by a cable 60 to a computer 62 which in turn is connected to the antenna terminals of a television set 64 by the leads 65–66 from the computer 62. Power for the computer is supplied from the conventional domestic electric system by lead 67 and the television set is likewise powered through lead 68.

The switch mechanism of the joy stick switch housing 18 is connected in the usual manner with the input pins (not shown) of the computer 60, of which four pins connect with the appropriate joy stick switch mechanism which controls direction of game play. One of the computer input pins is employed for the "fire" function in game play and another of the computer pins is a common ground for all operating functions. The present invention does not in any way affect the use of the directionality pins or wires but relates only to the use of the "fire" function pin and the ground pin of the computer through the joy stick switch means in housing 18 and the cable 60.

To begin with, the fire switch of the joy stick mechanism 18 is disconnected and the corresponding leads from the computer 62 are connected by leads 70 and 72 with the transducer switches 22 and 24 for my very special fire function operation and control.

In the circuitry shown, the switch 22 is a normally closed microswitch and the switch 24 is a normally open microswitch. The power input to these switches is by way of a single pole, double throw selector switch 74 to which the input lead 70 is connected at the center pole. This switch has three output terminals, but only the center terminal 75 and one side terminal 76 are used, the input wire 70 connecting at terminal 75. In the open position (position #1), the terminal 75 is connected to the common contact 77 of the lower microswitch 24 and in the closed position (position #2), terminal 76 connects with the normally closed contact 78 of microswitch 22, the common contact 79 thereof connecting directly with the computer ground lead 72, to which the normally open contact 80 of switch 24 is also connected.

In the operation of my elastomeric exercise apparatus control of a video computer system, with the selector switch 74 in the "open" or #1 position, the fire pin wire 70 is connected to the common terminal 77 of microswitch 24. The normally open contact 80 of this switch 24 connects by lead 72, through the joy stick housing, to the ground pin on the computer 62. Thus, when a stretching force is applied to the elastomer 12, the pull on the sleeve 42 and screw 47 causes the pressure disc 34 to depress the button 38 on microswitch 24 causing it to close thereby connecting or shorting the computer fire pin to the computer ground pin and causing a "fire" command in the video game operation. In this sequence, the microswitch 22 is inoperative.

When the selector switch 74 is closed, position #2, the fire pin wire 70 is connected to both the lower microswitch 24 and the upper microswitch 22. In this case, the upper microswitch 22 is normally connected through its closed contact 78 and common contact 79 to ground wire 72, thereby shorting the fire pin wire 70 to ground. This does not continuously cause a "fire" command to be generated because the video game programs are designed to require a "fire" command to be followed by a "no fire" condition in order for the computer to recognize a subsequent "fire" command. In effect, the computer requires an operator to make a separate and distinct effort to make each "fire" command.

In the operation of the system in position #2, the stretching of the elastomeric element 12 first opens the microswitch 22 to cause a no-fire condition and then closes microswitch 24 to produce a "fire" command, just as it would with the selector switch in the #1 position. The end effect is that the user must sequentially stretch and relax the stretching member 12 to make the fire function activate more than once. The user cannot hold the stretching member in any single position to obtain a series of fire commands.

This is true whether the selector switch is in position #1 or position #2. The difference in performance being only that in position b #1, the fire function activates only when the stretching member is stretched out, microswitch 24 alone being in the circuit. In position #2, both microswitches are in the circuit and the fire function will activate both when the member 12 is fully stretched and when it is relaxed.

Although but one specific embodiment of this invention is herein shown and described, it will be understood that the use and construction shown may be altered without departing from the spirit of the invention as defined by the following claims.

I claim:

1. The combination with an elastomeric stretching exercise apparatus of a joystick operated switch mechanism for operating a video game computer for the play of a video game, the said exercise apparatus comprising an elastic stretching member connected at one end to a handlebar and being suitably anchored at its opposite end to be stretchable to more than its relaxed length by manual pulling from the handlebar, a transducer body with which the handlebar is mounted in spaced relation and through which the stretching exercise member is connected, and switch means in said transducer body arranged for operation solely by the stretching action of the said stretching member as it is pulled from said handlebar, the last named switch means being connected to the computer to effect the "fire" operation of the joystick mechanism.

2. The combination with an elastomeric stretching exercise apparatus of a joystick operated switch mechanism for operating a video game computer for the play of a video game as defined by claim 1, wherein the said switch mechanism includes a switch for connection to the computer solely for performing the "fire" operation as required by play of the game, the said switch mechanism being contained in a housing on which the joystick is mounted, a transducer mechanism associated with the said handlebar and through which the stretching exercise member is connected to the handlebar, switch means in said transducer mechanism arranged for operation solely by the stretching action of the said stretching member as it is pulled from said handlebar, the last named switch means being connected to the computer to perform the "fire" operation of the joystick mechanism and the joystick mechanism "fire" operation switch being rendered inoperative, and means for mounting the joystick switch mechanism with said handlebar with the joystick operably positioned within the reach of the thumb and fingers of a person holding onto the handlebar.

3. In an elastomeric stretching exercise apparatus comprising an elastic stretching member, a video computer input means having a joystick operated switch mechanism and a housing unit therefor, a transducer mechanism having direct connection with said stretching member, a handlebar mounted above said transducer mechanism in spaced relation therewith, means for mounting said computer input means on an enclosure for housing said transducer mechanism with the joystick disposed for operation by a thumb or finger of a person holding onto said handlebar, and switch means included in said transducer mechanism for operating said computer independently of the said input means and in accordance with the extent of the pull from said handlebar during operation of the said stretching member.

4. An exercising apparatus according to claim 3 wherein the transducer comprises an enclosure having top and bottom walls, an elastically yieldable member mounted to the said top wall to depend therefrom, an elongate screw secured to and depending from said yieldable member and threaded into the upper end of an internally threaded sleeve slidable through the bottom wall of said housing with its lower end projecting therefrom, microswitches mounted in said housing with their operating buttons disposed adjacent the sleeve, said switches being spaced from each other in the direction of pull of said stretching member, a switch operating plate loosely carried on said sleeve above said switch buttons, and spring means normally urging said operating plate against said sleeve, said elastic stretching member being secured onto the projecting end of said sleeve whereby stretching tension will pull the sleeve against the resistance of said elastically yieldable member to cause successive engagement of said operating plate and the switch buttons.

5. An exercising apparatus according to claim 4 wherein a tubular spacer is slidably carried on the upper end of said sleeve and the switch operating plate is tiltably carried on said spacer.

6. An exercising apparatus according to claim 4 wherein adjustment of the switch operating plate lengthwise of the said screw to adjust the axial spacing of the plate relative to the switch buttons may be had by turning the sleeve on the said screw.

7. An exercising apparatus according to claim 4 wherein a bumper member is mounted on and depending from the bottom wall of said transducer housing adjacent the projecting end of the said sleeve, and the elastic stretching member is secured to the end of said sleeve by means of a spring clamp, the said bumper being within the range of the spring clamp wings to limit any inadvertent turning of the sleeve on the screw.

8. An exercising apparatus according to claim 4 wherein the said elastically yieldable member comprises a cylindrical form of a relatively stiff rubber within which a mounting screw is embedded and projects upward therefrom, said screw being secured in the upper wall of the said transducer housing, and the said elongated screw is likewise embedded in the said cylindrical form, the heads of said screws are spaced apart adjacent the center of the yieldable member whereby the yieldable member can stretch only in that area defined by the spacing of the said screw heads.

9. An exercising apparatus according to claim 3 wherein the transducer switch means comprises two microswitches, one normally closed and one normally open, connected in parallel between the computer fire pin and the computer ground pin, and wherein the normally closed microswitch is the first to be operated upon stretching of the elastic stretching member.

10. An exercise apparatus according to claim 3 wherein the handlebar is fixedly carried by a bracket means mounted on and extending upwardly from the mounting for the computer input means, said bracket means having a portion extending parallel with and above said handlebar a distance sufficient to serve as a rest for the palm of the operator's hand while the fingers thereof grip the handlebar for the pulling operation of the said stretching member.

* * * * *